Dec. 27, 1966   P. A. LINDAHL   3,294,888
PROCESS FOR DECORATING CANDLES AND THE LIKE
Filed Feb. 3, 1964
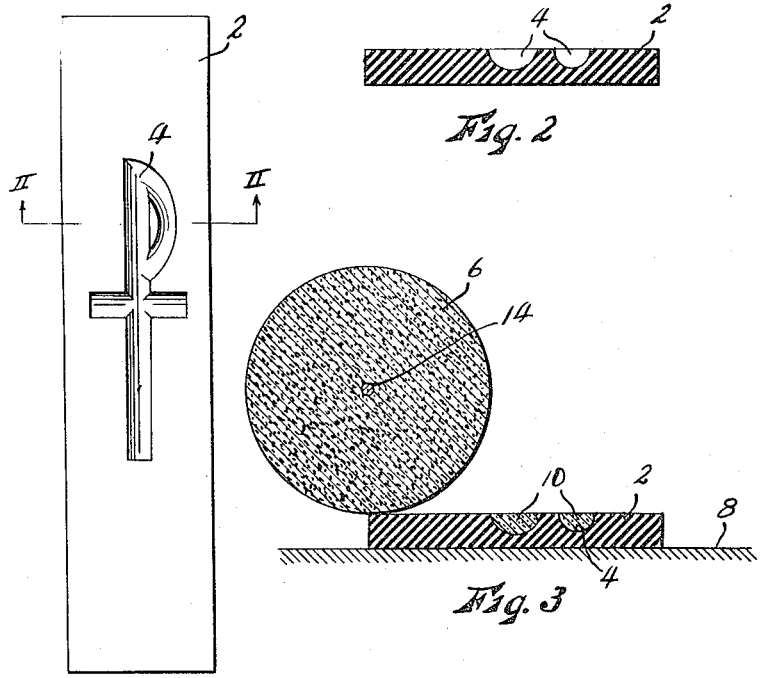
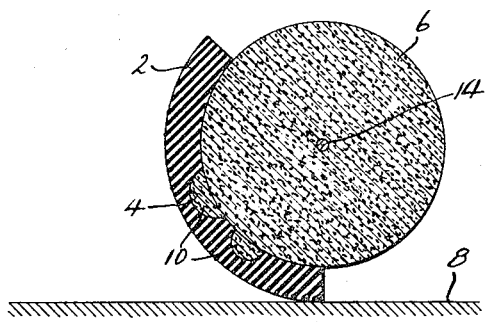
INVENTOR.
Paul A. Lindahl
BY John A. Hamilton
Attorney.

United States Patent Office 3,294,888
Patented Dec. 27, 1966

3,294,888
PROCESS FOR DECORATING CANDLES
AND THE LIKE
Paul A. Lindahl, 8005 W. 86th St.,
Overland Park, Kans. 66212
Filed Feb. 3, 1964, Ser. No. 342,066
8 Claims. (Cl. 264—248)

This invention relates to new and useful improvements in processes for decorating candles and the like, and relates more specifically to a process for applying a raised or embossed decoration formed of wax, such as paraffin or tallow, substantially the same as that of which the candle or other base object is formed, and of the same or contrasting color.

An important object of the present invention is the provision of a process whereby a raised decoration of any desired design or color may be applied to a candle or the like very easily and quickly with a bare minimum of equipment, by a fusion bonding process akin to welding or brazing, said process requiring virtually no technical knowledge or skill and being easily performed by novices.

Another object is the provision of a process of the character described which, while involving fusion bonding, cannot cause bleeding or running of dyes or other coloring matter from the decoration to the candle, or vice versa, which would of course be unsightly and highly objectionable.

A still further object is the provision of a process of the character described adaptable to apply decorations to cylindrical, conical, concave, convex or otherwise non-planar surfaces as well as to planar surfaces.

Generally, my process involves the use of a wax material for the decoration having a slightly higher melting point than the wax of the candle or other base object, the differential between the melting points being important for various reasons to be described. The decoration is first formed to the desired design, and applied to the candle, at a temperature below its melting point so as to be solid, but sufficiently close to its melting point to remain moldably plastic, and above the melting point of the candle.

Other objects are the provision of a process of the character described which requires little or no equipment to carry it out, which requires only normal manual dexterity and no specialized or technical knowledge or training, and which may be performed quickly and conveniently.

With these objects in view, as well as other objects which will appear in the course of the specification, reference will be had to the accompanying drawing, wherein:

FIG. 1 is a top plan view of a decoration mold suitable for use in carrying out my process, FIG. 2 is an enlarged sectional view taken on line II—II of FIG. 1, FIG. 3 is a view similar to FIG. 2 showing the mold supported on a planar surface, and with a candle (shown in section) positioned for application of the design, FIG. 4 is a view similar to FIG. 3, showing the decoration completely applied, and FIG. 5 is a side elevational view of the decorated candle, shown fragmentarily.

Like reference numerals apply to similar parts throughout the several views, and the numeral 2 applies to a mold suitable for use in carrying out my process. Said mold consists of a flat block of resiliently pliable material such as rubber, plastic, synthetic rubber or the like, having a cavity 4 formed in one face thereof, said cavity conforming in contour to the desired configuration of the decoration to be applied to a candle 6 or other base object formed of the usual candle wax or paraffin. The design formed by cavity 4 in the drawing is one form of the "Chi-Rho" design often used on candles in churches, although it will of course be apparent that any desired design could be utilized.

In carrying out my process, mold 2 is laid on a flat surface 8, such as a table top, as shown in FIG. 3 with cavity 4 opening upwardly, and cavity 4 is filled as with an eye-dropper, with a melted candle wax 10 having a melting point 10-15 degrees Fahr. higher than the melting point of the wax forming candle 6. Candle waxes having different melting points are readily available, or the melting point of any readily available wax, such as a companion candle to candle 6, can be raised by intermixing a material such as stearic acid therewith. The temperature difference between the melting points is important for reasons which will be described in detail hereinafter. Also, dye or other coloring matter may be added to the melted wax 10 if it is desired that the decoration contrast in color to the color of the candle. The candle 6, having a wick 14, or other base object to which the decoration is to be applied, is then laid along the edge of the top surface of mold 2, out of contact with the melted wax 10 in cavity 4, in such position that the decoration will be properly positioned relative to the candle when the mold is wrapped about said candle in a rolling motion. The candle illustrated in the drawing is cylindrical, being shown in section in FIG. 3, although as will appear it could be of virtually any configuration.

Melted wax 10 is then allowed to cool until it solidifies, as indicated by a filming-over and dulling of the previously wet and shiny surface thereof. Immediately thereafter, so that wax 10, though solid, will still remain moldably plastic and still at a temperature above the melting point of candle 6, the candle is rolled over the top surface of mold 2, making certain that the mold is conformed to the surface of the candle, as shown in FIG. 4. Since wax 10, though not of course liquid at this time, is still hot enough to be plastically moldable, so that it can easily be shaped to conform to the surface contour of the candle, whether said candle be cylindrical as shown, or tapered, concave, convex, or virtually any other shape. If the candle were square, so as to have planar surfaces, the surface to be decorated would simply be lowered and pressed against the mold without rolling. Moreover, since wax 10 at this time is still at a temperature higher than the melting point of candle 12, contact thereof with the candle causes melting of the contacted surface portion of the candle, itself, resulting in permanent attachment of wax 10 to the candle when the candle is further allowed to cool below its melting point. The mold may then be peeled off and the decorated candle will then appear as in FIG. 5.

The wax 10 is secured to the candle by a fusion bonding process closely akin to welding. Technically, however, it more closely resembles brazing since not both of the mating surfaces are fused, but only that of the candle. However, the process has been thoroughly tested, and has been found to produce a thoroughly effective and fully adequate bond. It is of course quite basic to my process that at least one of the surfaces, either the candle or the decoration, not be melted or fused while in contact with the other, since this would result in bleeding or running of dye or coloring matter in the event the candle and decoration were of contrasting colors. Such bleeding of colors would of course be unsightly and hence objectionable. Joinder of the decoration by a process involving fusion of only one of the mating surfaces solves this problem.

It would of course be possible to supply pre-formed decorations which could be applied to candles after simply preheating them to a plastically moldable temperature above the melting point of the candles. It would then be possible to carry out the process without the requirement of a mold. However, the mold supplies a firm backing support for the decoration, so that it will not be crushed or mashed as it is molded to the surface of the candle while plastic, and use of the mold is therefore considered to be advantageous.

While the temperature differential of 10-15 degrees between the melting points of the decoration wax and the wax of the candle is not highly critical, there are several important reasons for maintaining said differential closely in this range:

Firstly, application of the decoration to the candle when exceeding the melting point of the candle by any substantially greater degree results in excessive melting of adjacent portions of the candle, causing the decoration to be embedded in the candle, resultant flow of candle wax around the edges of the decoration with obliteration of portions of the decoration, and in general a thoroughly unsightly and unsatisfactory product. A melting point differential in the range stated provides an effective bond with no apparent flowing or deformation of the candle wax. It would of course be possible to use a decoration wax with a higher melting point, then allow it to cool far below its solidification temperature, to within the desired 10-15 degree range above the candle melting point, before applying it to the candle. However, this would involve accurate temperature measurement in extremely difficult circumstances, as well as being objectionable for other reasons to be discussed below. The present process provides a visual, easily detectable signal, i.e., the filming-over of the surface of wax 10, indicating the time the decoration should be applied to the candle.

Secondly, the stated melting point differential provides a time interval, between solidification of the decoration wax and the time said wax cools to the melting point of the candle wax which is fully adequate for a person of normal dexterity to apply the decoration to the candle. The application must of course be made in this time interval. If the melting point differential were less than the stated amount to any substantial degree, the time interval available for application would be so short as to require extreme skill and dexterity.

Thirdly, waxes of the type commonly used in candles usually possess the degree of moldable plasticity necessary to permit the decoration to be molded to the surface of the candle only when heated to within perhaps 20-25 degrees below the melting point. It is therefore important that the differential of the melting points be less than this 20-25 degrees, since otherwise the decoration wax might be hot enough to be bonded to the candle, but still not be sufficiently plastic to be molded to the contour of the candle, so that the decoration would break or crumble as force was applied to conform it to the candle.

Fourthly, if the melting point differential exceeds the stated range to any substantial degree, the decoration will not melt normally as the candle is consumed in use. That is, as the candle is consumed to a point below the top of the decoration, the decoration will not melt evenly therewith but will be self-supported and project above the candle to a greater or less degree. This is considered to be objectionable, but is overcome by maintaining the melting point differential within the stated range.

While I have shown and described specific examples of my process, it will be readily apparent that many minor changes or modifications therein could be made without departing from the spirit of the invention as defined by the scope of the appended claims.

What I claim as new and desire to protect by Letters Patent is:

1. The process of applying a raised decoration of wax or the like to a candle or other base object formed of wax or the like comprising:
    (a) forming said decoration of a wax material having a melting point higher than that of the material of which said base object is formed,
    (b) heating said decoration to a temperature above the melting point of said base object but below the melting point of said decoration, and
    (c) pressing said decoration against said base object, whereby said decoration is firmly bonded to said base object.

2. The process as recited in claim 1 wherein the melting point of said decoration material is sufficiently close to, though higher than, the melting point of said base material that said decoration material is plastic and moldable, though solid, when at a temperature equal to the melting point of said base material.

3. The process as recited in claim 1 wherein the melting point of said decoration material is sufficiently close to, though higher than, the melting point of said base material that said decoration material is plastic and moldable, though solid, when at a temperature equal to the melting point of said base material, and with the additional step of:
    (a) shaping said decoration to conform to the surface contour of said base object while the former is at a temperature intermediate said two melting points.

4. The process as recited in claim 1 wherein the melting point of said decoration material is about 10-15 degrees Fahr. higher than the melting point of said base material, whereby the former will remain moldably plastic, though solid, when cooled to the melting point of said base material, and with the additional step of:
    (a) shaping said decoration to conform to the surface contour of said base object while the former is at a temperature intermediate said two melting points.

5. The process as recited in claim 1 wherein the melting point of said decoration material is about 10-15 degrees Fahr. higher than the melting point of said base material.

6. The process of applying a raised decoration of wax or the like to a candle or other base object formed of wax or the like comprising:
    (a) melting the material of which said decoration is to be formed, said decoration having a higher melting point than that of the material of which base object is formed,
    (b) pouring said melted decoration material into an open-faced mold having the desired configuration,
    (c) cooling said decoration material to a temperature below the melting point thereof but above the melting point of said base object material, and
    (d) pressing the open face of said mold against said base object whereby said decoration is transferred and firmly bonded to said base object.

7. The process as recited in claim 6 wherein the melting point of said decoration material is no more than about 10-15 degrees Fahr. higher than the melting point of said base material.

8. The process as recited in claim 6 wherein the melting point of said decoration material is no more than about 10-15 degrees Fahr. higher than the melting point of said base material, whereby said decoration material will remain moldably plastic, though solid, at all temperatures intermediate said melting points, and wherein said mold is elastically deformable, and with the additional step of:
    (a) shaping said decoration by external manipulation of said mold to conform to the surface contour of said base object while the former is at a temperature intermediate said two melting points.

(References on following page)

References Cited by the Examiner

UNITED STATES PATENTS

| | | | |
|---|---|---|---|
| 472,945 | 4/1892 | Forster | 264—132 X |
| 2,122,451 | 7/1938 | Cassimatis | 264—245 |
| 2,229,131 | 1/1941 | Root | 264—246 |
| 2,619,753 | 12/1952 | Lurie | 262—132 |
| 2,636,370 | 4/1953 | Kramer | 264—132 X |
| 2,703,773 | 3/1955 | Stimson | 264—248 X |

ROBERT F. WHITE, *Primary Examiner.*

L. S. SQUIRES, *Assistant Examiner.*